United States Patent
Zeng

(10) Patent No.: US 10,821,494 B2
(45) Date of Patent: Nov. 3, 2020

(54) METHOD FOR MANUFACTURING A MIDDLE FRAME FOR MOBILE TERMINAL AND MOBILE TERMINAL WITH A MIDDLE FRAME

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 72 days.

(21) Appl. No.: 16/156,034

(22) Filed: Oct. 10, 2018

(65) Prior Publication Data

US 2019/0143388 A1    May 16, 2019

(30) Foreign Application Priority Data

Nov. 10, 2017  (CN) .......................... 2017 1 1106548

(51) Int. Cl.
  *B21D 22/02*   (2006.01)
  *B23P 15/00*   (2006.01)
  *B21D 13/02*   (2006.01)
  *G06F 1/16*    (2006.01)
  *H04M 1/02*    (2006.01)

(52) U.S. Cl.
  CPC .......... *B21D 22/025* (2013.01); *B21D 13/02* (2013.01); *B23P 15/00* (2013.01); *G06F 1/1656* (2013.01); *H04M 1/0202* (2013.01)

(58) Field of Classification Search
  CPC ....... B21D 22/025; B21D 13/02; B23P 15/00; G06F 1/1656; H04M 1/0202
  See application file for complete search history.

(56) References Cited

U.S. PATENT DOCUMENTS

| 4,433,465 A | 2/1984 | Nakano et al. |
| 2014/0118895 A1 | 5/2014 | Su et al. |

FOREIGN PATENT DOCUMENTS

| CN | 104618530 A | 5/2015 |
| CN | 106141586 A | 11/2016 |
| CN | 106217914 A | 12/2016 |
| CN | 107199287 A | 9/2017 |
| CN | 107552638 A | 1/2018 |

OTHER PUBLICATIONS

International search report, PCT/CN2018/106750, dated Dec. 25, 2018 (5 pages).
European search report, EP18193728.5 dated Apr. 5, 2019 (7 pages).

*Primary Examiner* — Moshe Wilensky

(57) ABSTRACT

The present disclosure provides a method for manufacturing a middle frame for mobile terminal and a mobile terminal with a middle frame. The method may include: providing a metal plate; forming a number of elongated protrusions arranged in parallel on the plate, the elongated protrusions each extending along a length direction of the metal plate; forming a tubular blank by bending the metal plate such that each of the elongated protrusions extends around the tubular blank; and cutting the tubular blank into a number of annular pieces, wherein each of the annular pieces includes one of the elongated protrusions.

19 Claims, 8 Drawing Sheets

METHOD FOR MANUFACTURING A MIDDLE FRAME FOR MOBILE TERMINAL AND MOBILE TERMINAL WITH A MIDDLE FRAME

CROSS-REFERENCE TO RELATED APPLICATIONS

The present application claims foreign priority of Chinese Patent Application No. 201711106548.4, filed on Nov. 10, 2017 in the State Intellectual Property Office of China, the entire contents of which are hereby incorporated by reference.

TECHNICAL FIELD

The present disclosure generally relates to the electronic device field, and in particular to a method for manufacturing a middle frame for mobile terminal and a mobile terminal with a middle frame.

BACKGROUND

In related art, for preparing the middle frame for mobile terminal, the computer numerical control (CNC) method is usually applied. In a CNC system, the manufacturing process of the middle frame is automated by executing pre-programmed sequences of machine control commands. For manufacturing a metal middle frame, a metal plate whose thickness is larger than the required width of the designed middle frame may be employed as raw material. Then the metal plate is machined in the CNC system, and unnecessary material is removed from the metal plate. Finally only a portion of the original metal plate is kept to form the middle frame.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

Figure 1:
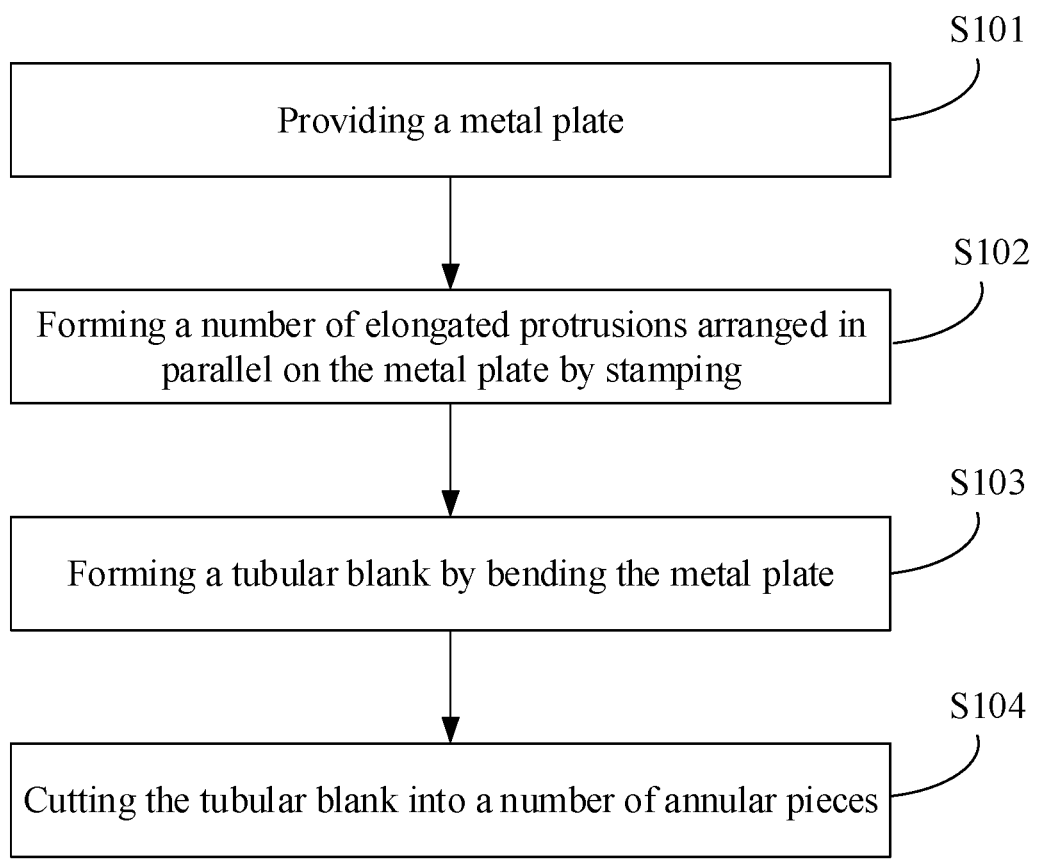
FIG. 1 is a flow chart of the method for manufacturing a middle frame for mobile terminal according to an embodiment of the present disclosure.

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

If a middle frame is manufactured mainly by CNC method, a long processing period is required and a lot of raw material is wasted. In this circumstance, the production cost for the middle frame by using CNC method is very high.

In an aspect, the present disclosure provides a method for manufacturing a middle frame for mobile terminal. The method may including: providing a metal plate; forming a plurality of elongated protrusions arranged in parallel on the plate, the plurality of elongated protrusions each extending along a length direction of the metal plate; forming a tubular blank by bending the metal plate such that each of the plurality of elongated protrusions extends around the tubular blank; and cutting the tubular blank into a plurality of annular pieces, wherein each of the plurality of annular pieces comprises one of the plurality of elongated protrusions.

In some embodiments, the method may further include: before the forming a tubular blank by bending the metal plate, forming a plurality of spacing protrusions between each two adjacent ones of the plurality of elongated protrusions by stamping the metal plate, wherein each of the plurality of spacing protrusions connects to two adjacent ones of the plurality of elongated protrusions; wherein, during the cutting the tubular blank into the plurality of annular pieces, each of the plurality of spacing protrusions is cut in halves to form a protecting portion on each of the plurality of annular pieces.

In some embodiments, the method may further include: connecting together two ends of the one of the plurality of elongated protrusions of each of the plurality of annular pieces.

In some embodiments, the connecting together the two ends of the one of the plurality of elongated protrusions may include: performing nano-molding treatment to connect together the two ends of the one of the plurality of elongated protrusions.

In some embodiments, the method may further include: forming a middle plate at a center of each of the plurality of annular pieces by injection molding; or providing a plurality of middle plates, locating each of the plurality of middle plates at a center of a respective one of the plurality of annular pieces and connecting each of the plurality of middle plates to the respective one of the plurality of annular pieces by injection molding.

In some embodiments, the method may further include: applying surface processing to an outer surface of each of the plurality of annular pieces, wherein the surface processing comprises at least one of anodizing, physical vapor deposition, deposition by electrophoresis or spraying.

In some embodiments, the method may further include: after the applying the surface processing, removing the protecting portion of each of the plurality of annular pieces.

In some embodiments, the method may further include: before the forming the tubular blank by bending the metal plate, removing a portion of the metal plate located between two adjacent ones of the plurality of elongated and between two of the plurality of spacing protrusions.

In some embodiments, each of the plurality of elongated protrusions comprises a length portion and a width portion, a width of the length portion is different from a width of the width portion; and during the forming the tubular blank by bending the metal plate and the cutting the tubular blank into the plurality of annular pieces, the length portion forms a length edge of a respective one of the plurality of annular pieces, and the width portion forms a width edge of the respective one of the plurality of annular pieces.

In some embodiments, the method may further include: before the forming the plurality of elongated protrusions, forming a location hole on the metal plate.

In some embodiments, a thickness of the metal plate is no larger than 2 mm.

In another aspect, the present disclosure provides a method for manufacturing a number of middle frames for mobile terminal. The method may include: providing a metal plate; stamping the metal plate to form a plurality of elongated protrusions, a plurality of spacing protrusions and an intermediate portion, wherein each of the plurality of elongated protrusions extends along a length direction of the metal plate; the plurality of spacing protrusions are located between each two adjacent ones of the plurality of elongated protrusions, and each of the plurality of spacing protrusions connects to two adjacent ones of the plurality of elongated protrusions; and the intermediate portion is located among the plurality of elongated protrusions and the plurality of spacing protrusions; removing a portion of the intermediate portion by stamping; bending the metal plate to form a tubular blank such that each of the plurality of elongated protrusions extends around the tubular blank; and cutting the tubular blank into a plurality of annular pieces, wherein each of the plurality of annular pieces comprises one of the plurality of elongated protrusions, and each of the plurality of spacing protrusions is cut in halves to form a protecting portion on each of the plurality of annular pieces.

In some embodiments, the method may further include: performing nano-molding treatment to connect together the two ends of the one of the plurality of elongated protrusions.

In some embodiments, the method may further include: forming a middle plate at a center of each of the plurality of annular pieces by injection molding; or providing a plurality of middle plates, locating each of the plurality of middle plates at a center of a respective one of the plurality of annular pieces and connecting each of the plurality of middle plates to the respective one of the plurality of annular pieces by injection molding.

In some embodiments, the method may further include: applying surface processing to an outer surface of each of the plurality of annular pieces, wherein the surface processing comprises at least one of anodizing, physical vapor deposition, deposition by electrophoresis and spraying.

In some embodiments, the method may further include: after the applying the surface processing, removing the protecting portion of each of the plurality of annular pieces.

In some embodiments, each of the plurality of elongated protrusions comprises a length portion and a width portion, a width of the length portion is different from a width of the width portion; and during the forming the tubular blank by bending the metal plate and the cutting the tubular blank into the plurality of annular pieces, the length portion forms a length edge of a respective one of the plurality of annular pieces, and the width portion forms a width edge of the respective one of the plurality of annular pieces.

In some embodiments, the method may further include: before the stamping the metal plate, forming a location hole on the metal plate.

In some embodiments, a thickness of the metal plate is no larger than 2 mm.

In yet another aspect, the present disclosure provides a mobile terminal including a display screen, a middle frame and a back case. The middle frame is connected between the display and the back case. The middle frame is manufactured by: providing a metal plate; forming a plurality of elongated protrusions arranged in parallel on the plate, the plurality of elongated protrusions each extending along a length direction of the metal plate; forming a tubular blank by bending the metal plate such that each of the plurality of elongated protrusions extends around the tubular blank; and cutting the tubular blank into a plurality of annular pieces, wherein each of the plurality of annular pieces comprises one of the plurality of elongated protrusions.

Referring to FIG. 1, FIG. 1 is a flow chart of a method for manufacturing a middle frame for mobile terminal. As shown in FIG. 1, the method may begin at block S101.

At block S101, Providing a metal plate.

The metal plate may be made of suitable metal material such as aluminum, aluminum alloy, steel and the like. In some embodiments, the thickness of the metal plate may be no larger than 2 mm. For instance, the thickness of the metal plate may range from 0.8 mm to 1.5 mm, or the thickness may be 1 mm.

At block S102: Forming a number of elongated protrusions arranged in parallel on the metal plate by stamping.

The elongated protrusions may be utilized to form the main structure of the middle frame in subsequent processes. Thus, the width and length of each elongated protrusion may be based on the design requirement of the width and the circumference of the final product, i.e., the middle frame. Each elongated protrusion may extend along a length direction of the metal plate.

In one embodiment, the elongate protrusion may extend from one end of the metal plate to another end of the metal plate. In another embodiment, the length of the elongated protrusion may be smaller than the total length of the metal plate and an offcut portion may be kept on at least one side of the metal plate.

The elongated protrusion may have different configurations. For example, the protrusion may have either a curved outer surface or a flat outer surface. In S102, multiple elongated protrusions may be formed on the metal plate and arranged in parallel by stamping with a proper stamping die. The number of the elongated protrusions on the metal plate may be equal to or larger than the number of middle frames that can be made from the metal plate.

At block S103: Forming a tubular blank by bending the metal plate.

In S103, the metal plate on which the elongated protrusions have been formed may be bent so as to form a tubular blank. Accordingly, the elongated protrusions may extend around the tubular blank after being bent. The outlines of the tubular blank may be in a shape of rectangle, polygon, ellipse etc. After the bending process, two ends of each of the elongated protrusions may be in touch or be very close. Thus, the two ends of each of the elongated protrusions may be easily connected in subsequent processes if necessary.

In some embodiments, if an offcut portion exists on a side of the metal plate in the extending direction of the elongated protrusion, the offcut portion may be removed before the bending process.

At block S104: Cutting the tubular blank into a number of annular pieces.

In S104, the tubular blank may be cut to form multiple annular pieces. Each of the annular pieces may include one elongated protrusion. The annular piece may be used as the middle frame for mobile terminal. In one embodiment, the tubular blank may be cut substantially along the fringe of the elongated protrusion such that one annular piece may consist of one elongated protrusion. In another embodiment, the tubular blank may be cut partially along the fringe of the elongated protrusion such that one annular piece may include not only one elongated protrusion but also some additional portions connecting to the elongated protrusion.

According to the present disclosure, a number of elongated protrusions formed on the metal plate by stamping may be finally formed into a number of middle frames. Only a small portion of the metal plate is wasted during the manufacturing process compared with the CNC method. Furthermore, it is possible to manufacturing multiple middle frames in one manufacturing process. Therefore, the implementation of the present disclosure may reduce production cost and production period of the middle frame.

Figure 2:
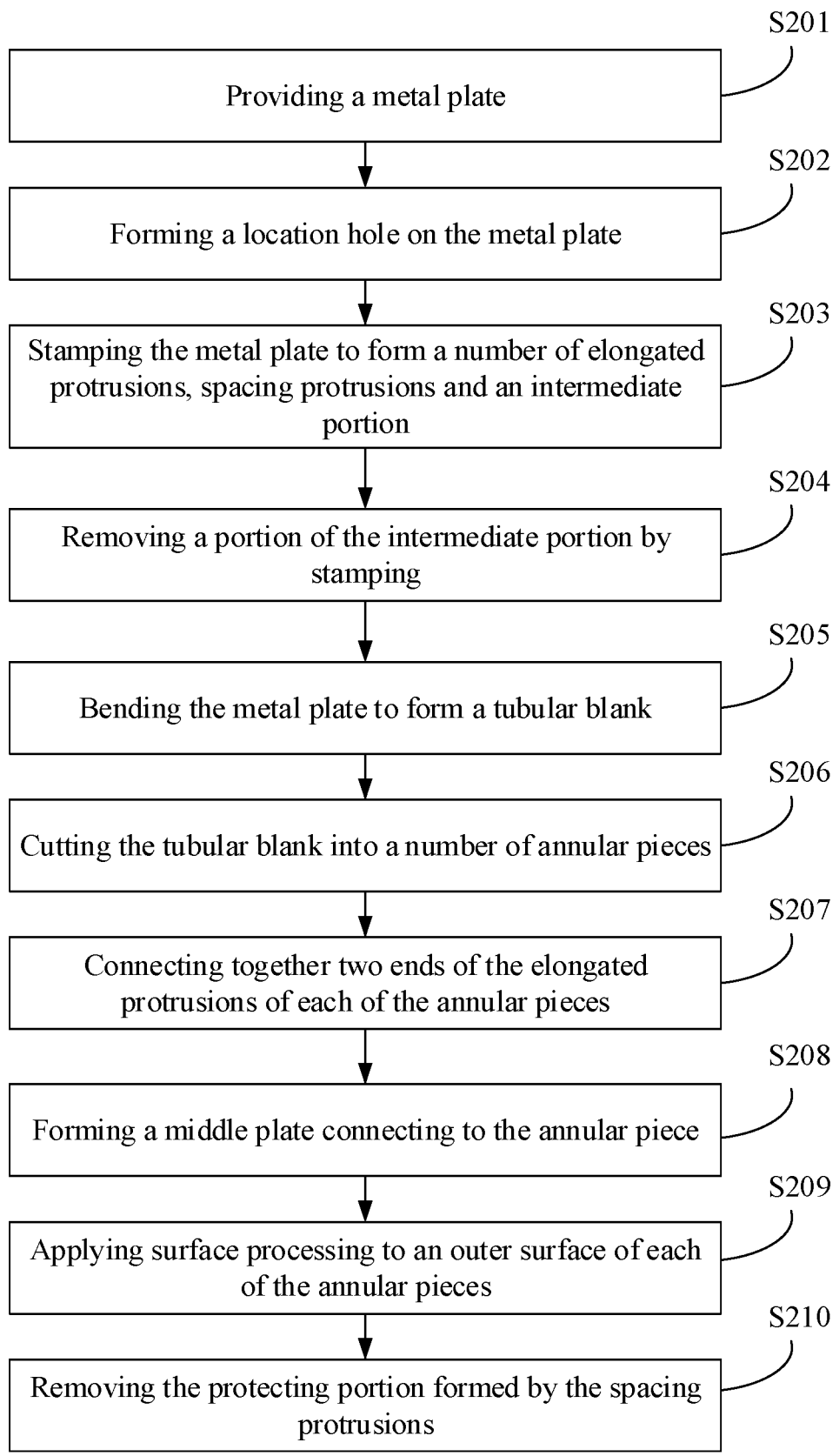
FIG. 2 is a flow chart of the method for manufacturing a middle frame for mobile terminal according to another embodiment of the present disclosure.

Referring to FIG. 2, FIG. 2 is a flow chart of a method for manufacturing a middle frame for mobile terminal according to another embodiment of the present disclosure. As shown in FIG. 2, the method may include the following blocks.

At block S201: Providing a metal plate.

At block S202: Forming a location hole on the metal plate.

Figure 3:
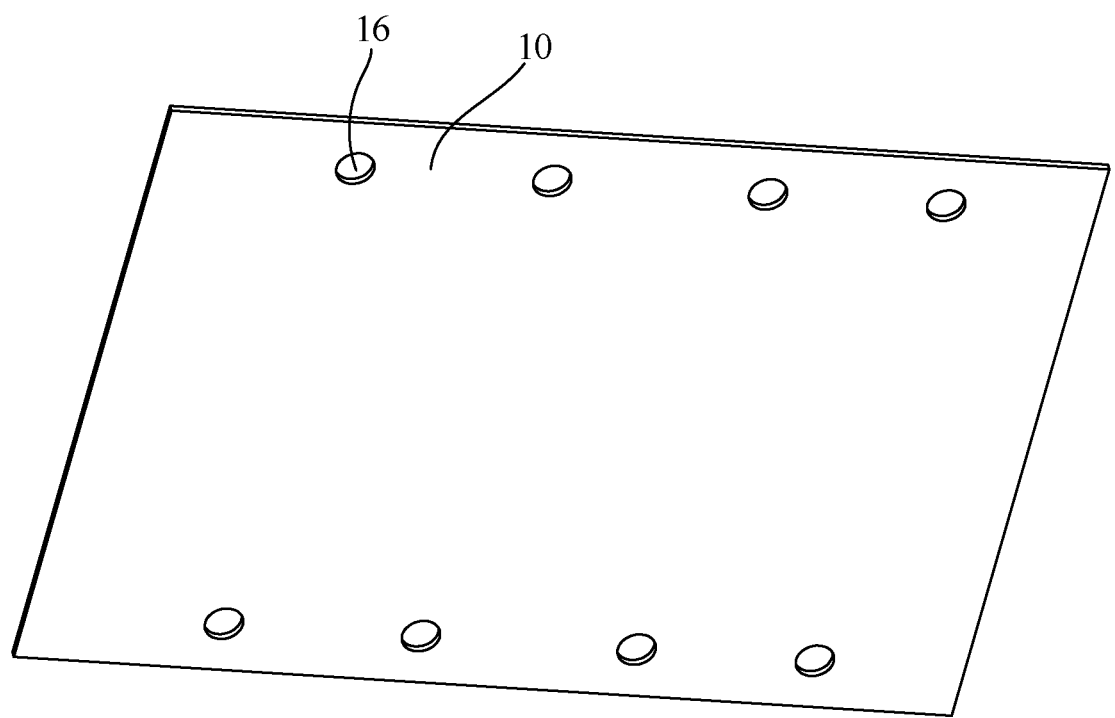
FIGS. 3 to 9 show the manufacturing processes of a middle frame for mobile terminal.

Referring also to FIG. 3, in this embodiment, the metal plate 10 may have a rectangular shape. One or more location hole 16 may be formed on the metal plate 10 by stamping, drilling or other methods. In subsequent processes, the metal plate 10 may be fixed firmly by using the location hole 16, which may facilitate the fixation and localization of the metal plate 10 so as to ensure processing precision.

At block S203: Stamping the metal plate to form a number of elongated protrusions, spacing protrusions and an intermediate portion.

At block S204: Removing a portion of the intermediate portion by stamping.

Figure 4:
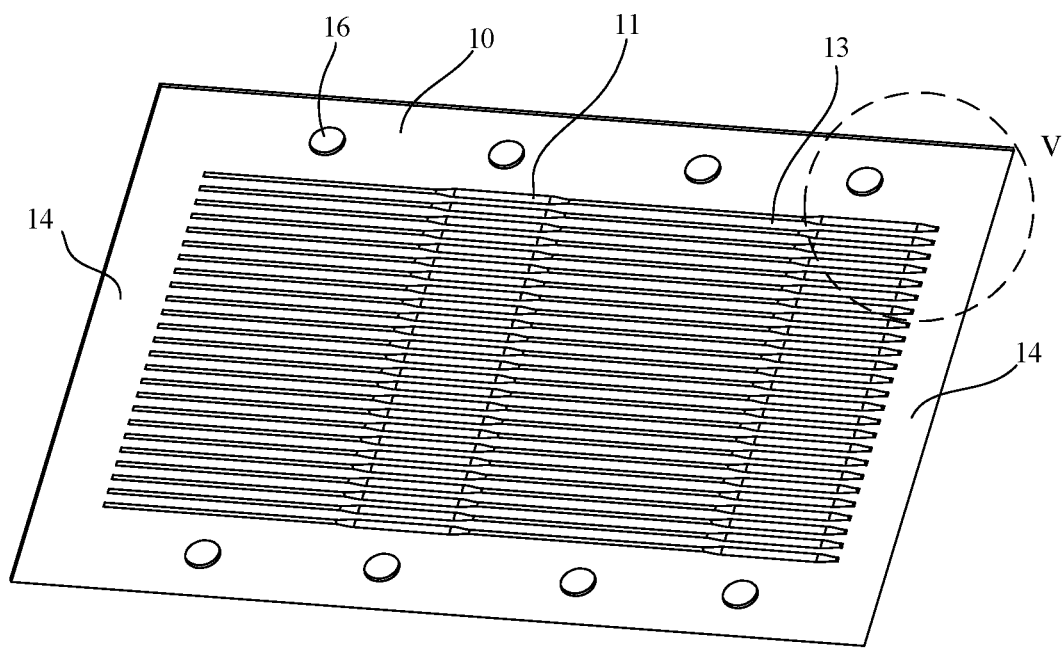
Figure 5:
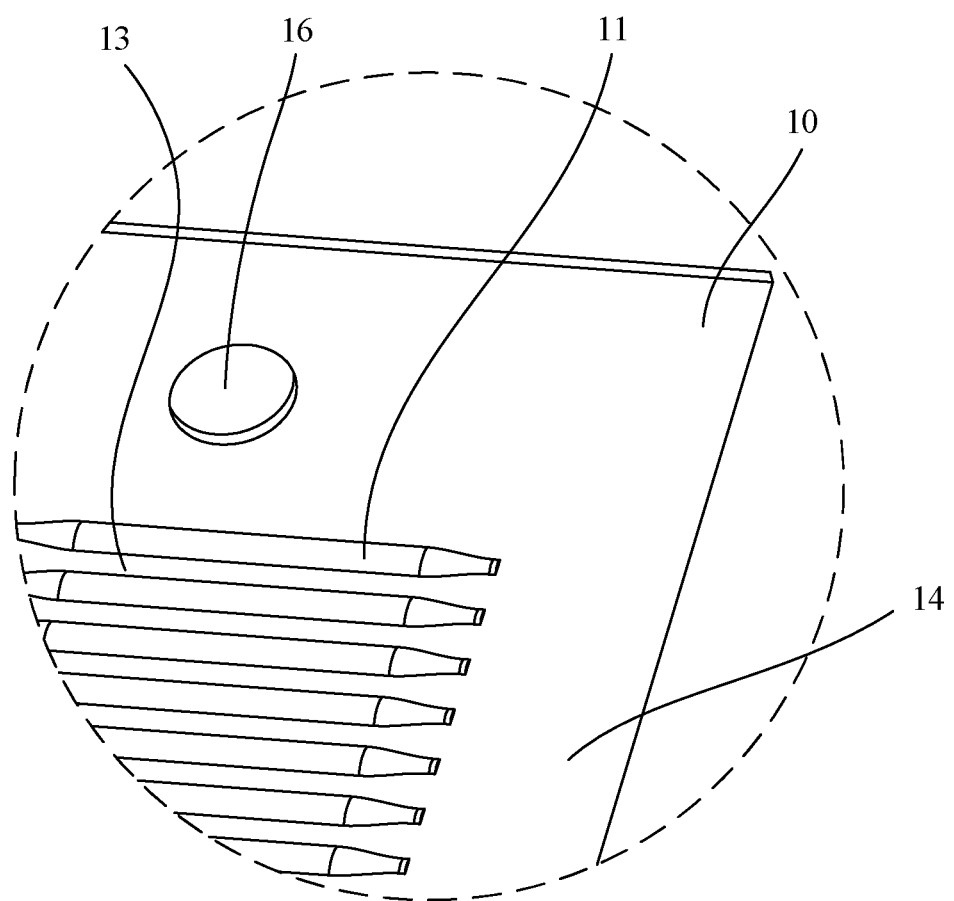
Figure 6:
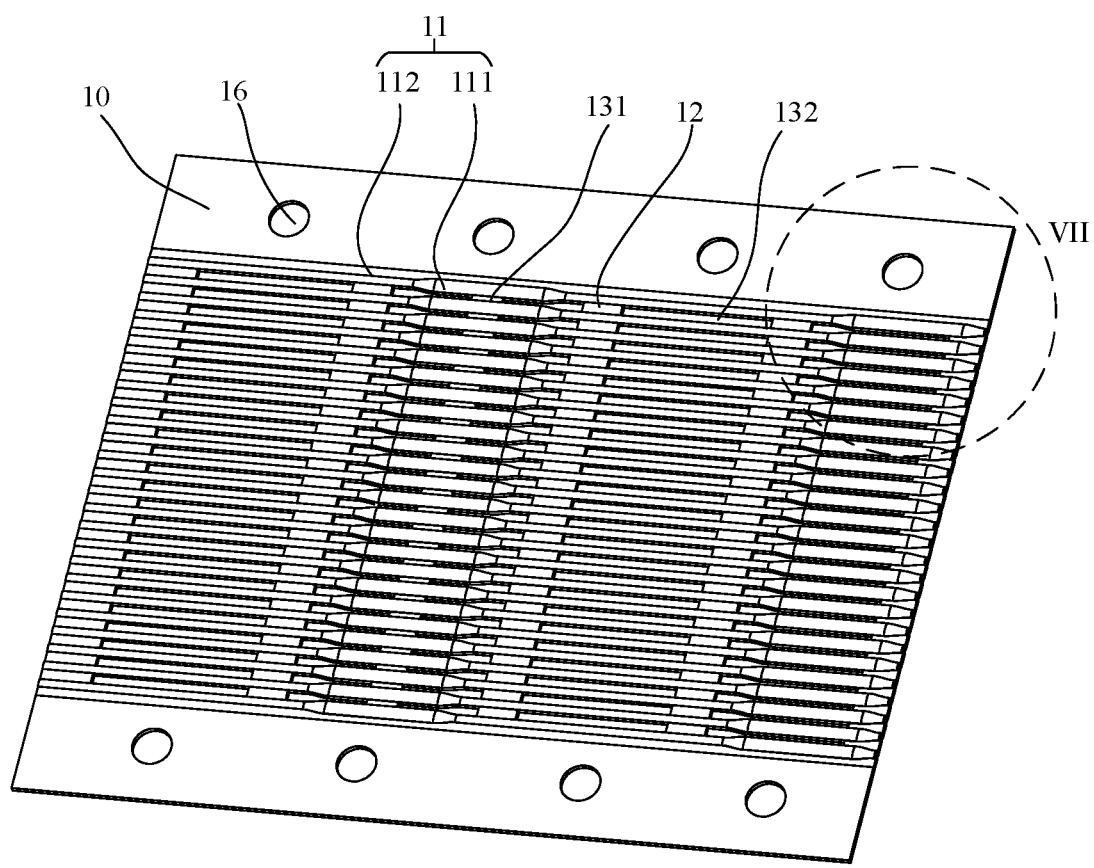
Figure 7:
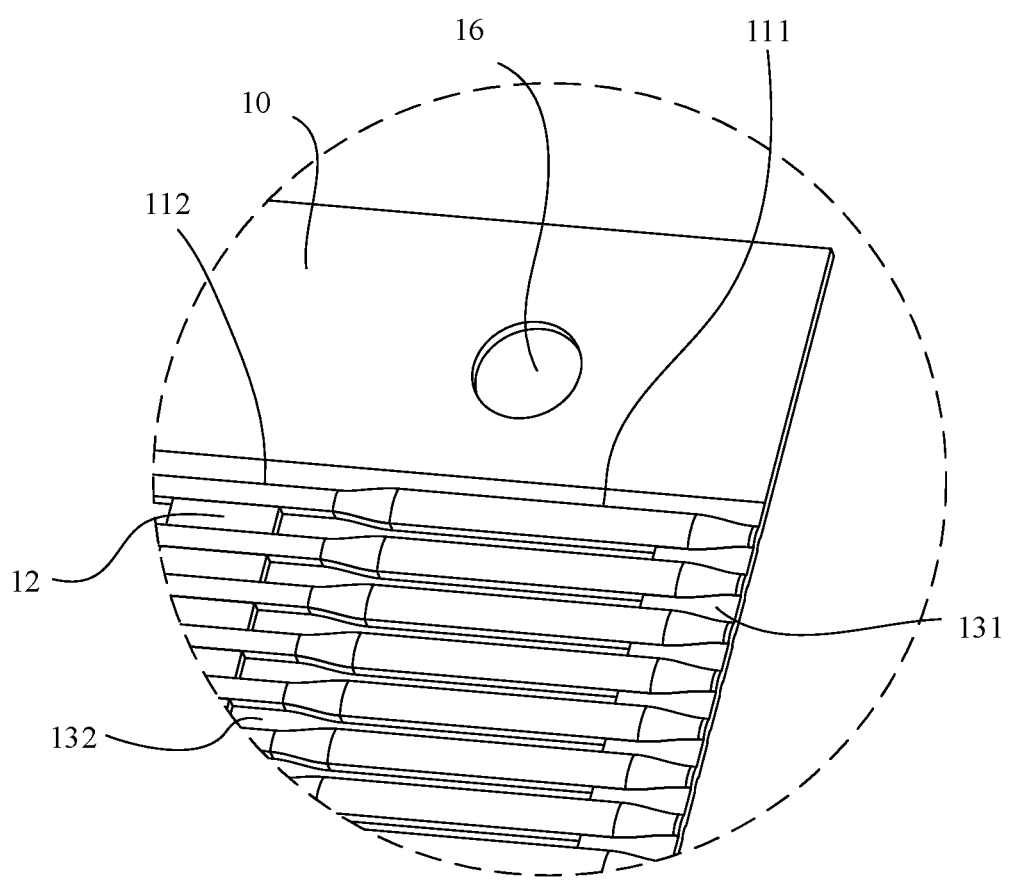

Referring also to FIGS. 4-7, FIG. 5 is an enlarged view of the zone V shown in FIG. 4, and FIG. 7 is an enlarged view of the zone VII shown in FIG. 6.

In S203, multiple elongated protrusions 11 may be formed on the metal plate 10a. Furthermore, multiple spacing protrusions 12 may be formed between each two adjacent elongated protrusions 11. The spacing protrusions 12 may connect to two adjacent elongated protrusions 11. It should be noticed that, the elongated protrusions 11 and the spacing protrusions 12 may be formed either simultaneously or successively. In other word, the elongated protrusions 11 and the spacing protrusions 12 may be formed either in one same stamping process or in multiple stamping processes. Moreover, after the stamping process, an intermediate portion 13 may be formed. The intermediate portion 13 may refer to a portion of the metal plate 10 which is located among the elongated protrusions 11 and the spacing protrusions 12.

In S204, a portion of the intermediate portion 13 may be removed. In this embodiment, a portion of the intermediate portion 13 may be removed to form an opening 132 while the other portion of the intermediate portion 13 may be kept to form a remaining portion 131, as shown in FIGS. 6 and 7. In this circumstance, different elongated protrusions 11 may be connected together by the remaining portion 131 and the spacing protrusions 12. It should be understood that, although not shown, the intermediate portion 13 may be completely removed in other embodiments, in which case different elongated protrusions 11 may be connected together only by the spacing protrusions 12.

According to this embodiment, a portion of the intermediate portion 13 may be removed such that it will no longer be necessary to cut large area of material off in subsequent processes (after bending the metal plate 10). Compared with cutting directly a tubular structure, cutting a plate is much easier and may have a better control precision.

At block S205: Bending the metal plate to form a tubular blank.

Figure 8:
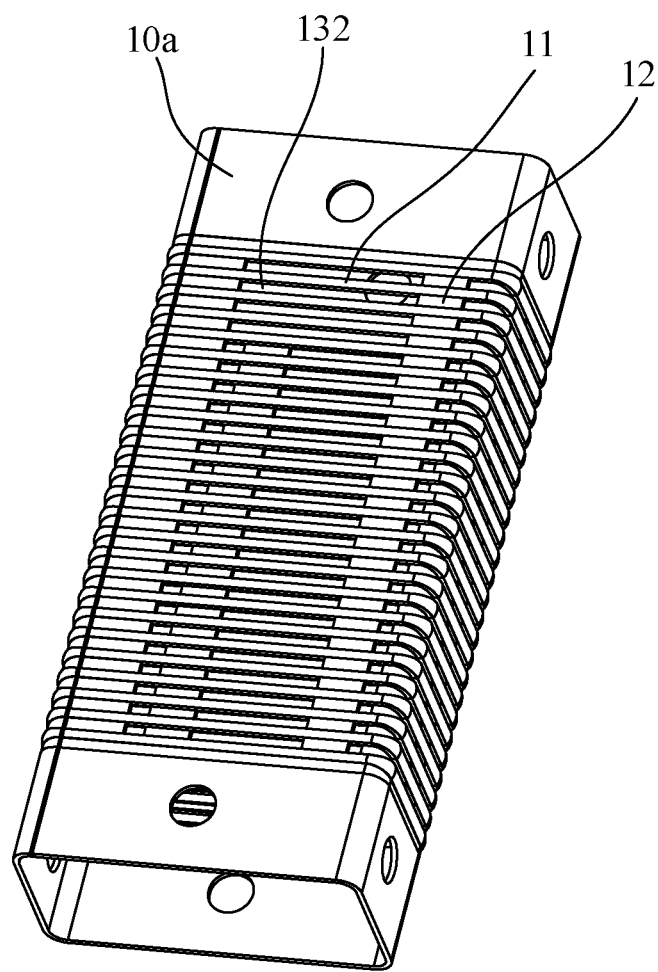

Referring to FIG. 8, the metal plate 10 may be bent to form a tubular blank 10a. In this embodiment, the tubular blank 10a may have a rectangular and tubular configuration. In other embodiment, the tubular blank 10a may have other configuration according to design requirement of the shape of middle frame.

In some embodiment, an offcut portion 14 may exist after the elongated protrusions 11 are formed, as shown in FIGS. 4 and 5. In this embodiment, the offcut portion 14 may be removed by cutting, stamping or other methods before bending the metal plate 10.

At block S206: Cutting the tubular blank into a number of annular pieces.

Figure 9:
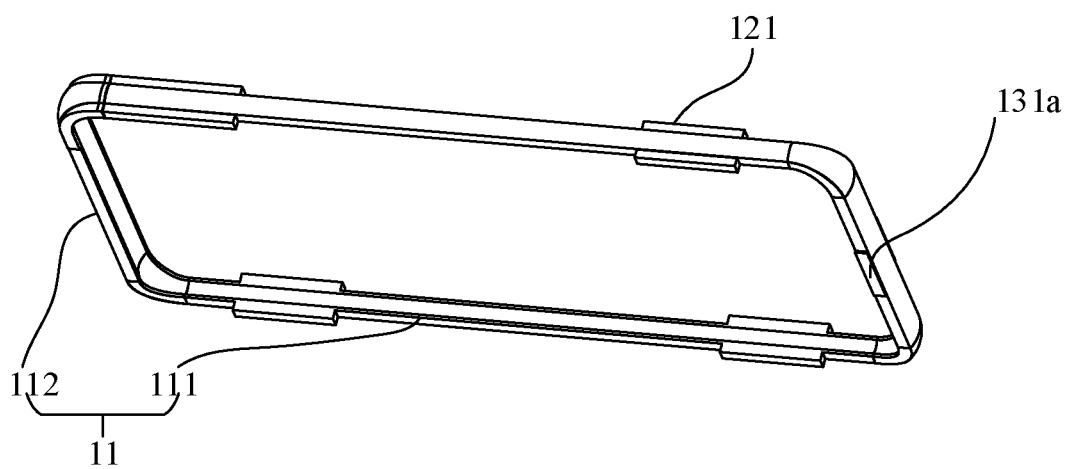

Referring to FIG. 9, in S206, the tubular blank 10a may be cut into a number of annular pieces 15. In other words, adjacent protrusions 11 may be separated to form part of or the whole of the annular pieces 15. In this embodiment, each of the annular pieces 15 may include one elongated protrusion 11, a protecting portion 121 (formed by the spacing protrusion 12) and a remaining portion 131a. The spacing protrusions 12 formed in S203 may be utilized to indicate the cutting lines between different elongated protrusions 11.

In this embodiment, the spacing protrusions 12 may each be cut in halves to form a protecting portion 121 on each of the annular pieces 15. The protecting portion 121 may be utilized for the fixation and protection of the annular piece 15 in subsequent processes such as molding and surface treatment. Even the protecting portion 121 is damaged during subsequent processes, the quality of the final product will not be influenced because the protecting portion 121 may be finally removed. The remaining portion 131a may have similar function as the protecting portion 121 and will not be further described hereon.

In one embodiment, each of the plurality of elongated protrusions 11 may include a length portion 112 and a width portion 111 as shown in FIGS. 6 and 7. The width of the length portion 112 may be different from the width of the width portion 111. After the S205 of bending the metal plate 10, the length portion 112 and the width portion 111 of the elongated protrusions 11 may be located at different sides of the tubular blank 10a. After the S206 of cutting the tubular blank 10a, the length portion 111 may form a length edge of the annular piece 15 while the width portion 112 may form a width edge of the annular piece 15.

At block S207: Connecting together two ends of the elongated protrusion of each of the annular pieces.

For each of the annular pieces, the two ends of the elongated protrusion may be connected by welding, molding or other suitable methods, In one embodiment, nano-molding treatment (NMT) may be applied to connect together the two ends of each of the elongated protrusions 11 of the annular pieces 15. Specifically, a T treatment may be firstly performed in the area where the NMT is to be applied so as to remove the grease and to great micro recess on the metal surface, which facilitate the connection between metal and plastic. Then plastic particles may be injected and cured on the surface of the two ends of the elongated protrusion 11 of the annular piece 15 such that the two ends of the elongated protrusion 11 together with the plastic material may be connected integrally.

At block S208: Forming a middle plate connecting to the annular piece.

In S208, the annular piece may be put into a mold where the injection molding may be applied.

In one embodiment, a middle plate (not shown) may be directly formed at the center of each of the annular pieces 15 by injection molding.

In another embodiment, the middle plate may be pre-manufactured. The prepared middle plate may be located at the center of the annular piece and then be connected to the annular piece by injection molding.

At block S209: Applying surface processing to an outer surface of each of the annular pieces.

To meet the design requirement of the product, the outer surface of the annular piece 15 may undergo a surface processing. The surface processing may include at least one of anodizing, physical vapor deposition, deposition by electrophoresis and spraying. Thus, different appearance effect such as colors and textures may be formed on the surface of the middle frame, such that the appearance of the middle frame may be improved.

At block S210: Removing the protecting portion formed by the spacing protrusions.

As described above, the protecting portion 121 may be utilized for fixation and protection in, by way of example but not limited to, S207-S209. Thus, after the S209 of applying surface processing, the protecting portion 121 of each of the annular pieces 15 may be removed by, for example, CNC cutting.

With the methods disclosed in the embodiments of the present disclosure, the middle frame for mobile terminal may be easily manufactured. Processing time and/or production cost may be reduced.

In another aspect of the present disclosure, a middle frame for mobile terminal may be provided. The middle frame may be manufactured by anyone of the methods described in above-mentioned embodiments.

Figure 10:
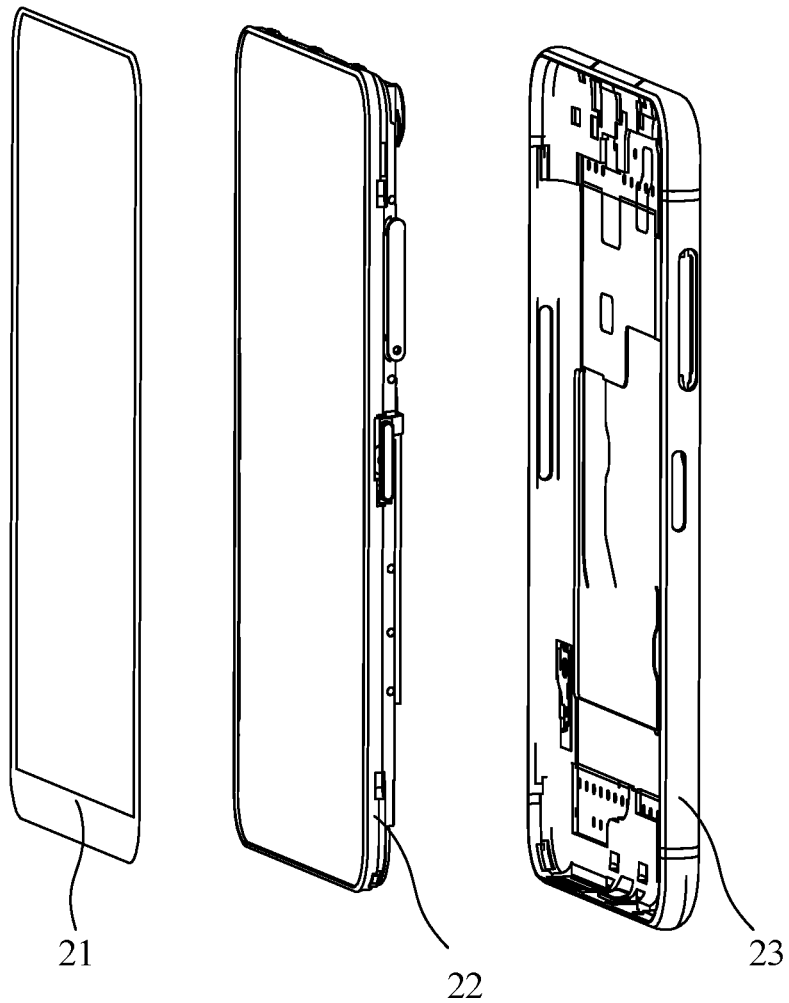
FIG. 10 is an exploded view of a mobile terminal according to an embodiment of the present disclosure.

Referring to FIG. 10, FIG. 10 shows an exploded view of a mobile terminal according to an embodiment of the present disclosure. As shown in FIG. 10, the mobile terminal 20 may include a display screen 21, a middle frame 22 and a back case 23. The middle frame 22 may be disposed between the display screen 21 and the back case 23. The middle frame 22 may be manufactured by any method described in above embodiments.

It is understood that, although not shown in the figure, the mobile terminal 20 may include other components or elements, such as LCD (or OLED) panel, circuit boards, battery, functional devices (camera, loudspeaker, light etc.) and the like.

It should be understood that terminologies, such as "length," "width," "thickness," "upper," "lower," etc., are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A method for manufacturing a middle frame for mobile terminal, comprising:
   providing a metal plate;
   forming a plurality of elongated protrusions arranged in parallel on the plate, the plurality of elongated protrusions each extending along a length direction of the metal plate;
   forming a tubular blank by bending the metal plate such that each of the plurality of elongated protrusions extends around the tubular blank; and
   cutting the tubular blank into a plurality of annular pieces, wherein each of the plurality of annular pieces comprises one of the plurality of elongated protrusions.

2. The method of claim 1, further comprising:
   before the forming a tubular blank by bending the metal plate, forming a plurality of spacing protrusions between each two adjacent ones of the plurality of elongated protrusions by stamping the metal plate, wherein each of the plurality of spacing protrusions connects to two adjacent ones of the plurality of elongated protrusions;
   wherein, during the cutting the tubular blank into the plurality of annular pieces, each of the plurality of spacing protrusions is cut in halves to form a protecting portion on each of the plurality of annular pieces.

3. The method of claim 2, further comprising:
   connecting together two ends of the one of the plurality of elongated protrusions of each of the plurality of annular pieces.

4. The method of claim 3, wherein the connecting together the two ends of the one of the plurality of elongated protrusions comprises:
   performing nano-molding treatment to connect together the two ends of the one of the plurality of elongated protrusions.

5. The method of claim 3, further comprising:
   forming a middle plate at a center of each of the plurality of annular pieces by injection molding; or
   providing a plurality of middle plates, locating each of the plurality of middle plates at a center of a respective one of the plurality of annular pieces and connecting each of the plurality of middle plates to the respective one of the plurality of annular pieces by injection molding.

6. The method of claim 5, further comprising:
   applying surface processing to an outer surface of each of the plurality of annular pieces, wherein
   the surface processing comprises at least one of anodizing, physical vapor deposition, deposition by electrophoresis or spraying.

7. The method of claim 6, further comprising:
   after the applying the surface processing, removing the protecting portion of each of the plurality of annular pieces.

8. The method of claim 2, further comprising:
before the forming the tubular blank by bending the metal plate, removing a portion of the metal plate located between two adjacent ones of the plurality of elongated and between two of the plurality of spacing protrusions.

9. The method of claim 1, wherein
each of the plurality of elongated protrusions comprises a length portion and a width portion, a width of the length portion is different from a width of the width portion; and
during the forming the tubular blank by bending the metal plate and the cutting the tubular blank into the plurality of annular pieces, the length portion forms a length edge of a respective one of the plurality of annular pieces, and the width portion forms a width edge of the respective one of the plurality of annular pieces.

10. The method of claim 1, further comprising:
before the forming the plurality of elongated protrusions, forming a location hole on the metal plate.

11. The method of claim 1, wherein
a thickness of the metal plate is no larger than 2 mm.

12. A method for manufacturing a plurality of middle frames for mobile terminal, comprising:
providing a metal plate;
stamping the metal plate to form a plurality of elongated protrusions, a plurality of spacing protrusions and an intermediate portion, wherein
each of the plurality of elongated protrusions extends along a length direction of the metal plate;
the plurality of spacing protrusions are located between each two adjacent ones of the plurality of elongated protrusions, and each of the plurality of spacing protrusions connects to two adjacent ones of the plurality of elongated protrusions; and
the intermediate portion is located among the plurality of elongated protrusions and the plurality of spacing protrusions;
removing a portion of the intermediate portion by stamping;
bending the metal plate to form a tubular blank such that each of the plurality of elongated protrusions extends around the tubular blank; and
cutting the tubular blank into a plurality of annular pieces, wherein each of the plurality of annular pieces comprises one of the plurality of elongated protrusions, and each of the plurality of spacing protrusions is cut in halves to form a protecting portion on each of the plurality of annular pieces.

13. The method of claim 12, further comprising:
performing nano-molding treatment to connect together the two ends of the one of the plurality of elongated protrusions.

14. The method of claim 13, further comprising:
forming a middle plate at a center of each of the plurality of annular pieces by injection molding; or
providing a plurality of middle plates, locating each of the plurality of middle plates at a center of a respective one of the plurality of annular pieces and connecting each of the plurality of middle plates to the respective one of the plurality of annular pieces by injection molding.

15. The method of claim 14, further comprising:
applying surface processing to an outer surface of each of the plurality of annular pieces, wherein the surface processing comprises at least one of anodizing, physical vapor deposition, deposition by electrophoresis and spraying.

16. The method of claim 15, further comprising:
after the applying the surface processing, removing the protecting portion of each of the plurality of annular pieces.

17. The method of claim 12, wherein
each of the plurality of elongated protrusions comprises a length portion and a width portion, a width of the length portion is different from a width of the width portion; and
during the forming the tubular blank by bending the metal plate and the cutting the tubular blank into the plurality of annular pieces, the length portion forms a length edge of a respective one of the plurality of annular pieces, and the width portion forms a width edge of the respective one of the plurality of annular pieces.

18. The method of claim 12, further comprising:
before the stamping the metal plate, forming a location hole on the metal plate.

19. The method of claim 12, wherein
a thickness of the metal plate is no larger than 2 mm.

* * * * *